United States Patent [19]
Seko et al.

[11] 4,049,769
[45] Sept. 20, 1977

[54] SEPARATION OF URANIUM ISOTOPES BY ACCELERATED ISOTOPE EXCHANGE REACTIONS

[75] Inventors: Maomi Seko; Tetsuya Miyake, both of Tokyo; Kohji Inada, Yokohama; Kazushi Ochi, Yokohama; Tomio Sakamoto, Yokohama, all of Japan

[73] Assignee: Asahi Kasei Kogyo Kabushiki Kaisha, Osaka, Japan

[21] Appl. No.: 711,748

[22] Filed: Aug. 4, 1976

[51] Int. Cl.$^2$ ............................................. C01G 56/00
[52] U.S. Cl. ...................................................... 423/7
[58] Field of Search ...................... 423/7; 252/301.1 R

[56] References Cited
U.S. PATENT DOCUMENTS

| 3,511,620 | 5/1970 | Shimokawa et al. | 423/7 |
| 3,953,569 | 4/1976 | Seko et al. | 423/7 |

FOREIGN PATENT DOCUMENTS

| 2,155,895 | 5/1972 | Germany | 423/7 |

Primary Examiner—Richard E. Schafer
Attorney, Agent, or Firm—Burgess, Dinklage & Sprung

[57] ABSTRACT

A novel catalyst for isotope exchange reaction between uranium(IV) and uranium(VI) compounds enables acceleration of the reaction rate as much as 3000 times to make industrial separation of uranium isotopes economically possible.

25 Claims, No Drawings

SEPARATION OF URANIUM ISOTOPES BY ACCELERATED ISOTOPE EXCHANGE REACTIONS

This invention relates to a new process for separating uranium isotopes. More particularly, the invention relates to a process for efficient separation of uranium isotopes by adding a catalyst to accelerate the isotope exchange reaction between uranium(IV) and uranium(VI) compounds. Uranium(IV) means all tetravalent uranium ions including complex ions, and similarly, uranium(VI) means all hexavalent uranium ions including complex ions.

It is well known in the art that isotope exchange occurs between a uranium(IV) compound and uranium(VI) compound when both compounds containing uranium isotopes $^{235}U$ and $^{238}U$ are contacted in a solution, whereby $^{235}U$ is enriched in the uranium(VI) compound and $^{238}U$ in uranium(IV) compound. Accordingly, when both compounds are separated from each other, after being contacted in a solution, by either chemical or mechanical means, uranium(VI) compound enriched with one isotope $^{235}U$ and uranium(IV) compound enriched with the other isotope $^{238}U$ can be obtained.

The amount of $^{235}U$ enriched after a single contact and separation step, however, is very small. In terms of the ratio $R_E/R_W$, wherein $R_E$ stands for the molar ratio of $^{235}U$ in uranium(VI) compound and $R_W$ for the molar ratio of $^{235}U$ in uranium(IV) compound, it is as small as 1.001–1.0013. Therefore, when a natural uranium compound is intended to be enriched with $^{235}U$ to a level industrially useful, the above procedure must be repeated for a few hundred times to a few thousand times. This is why the time required for completion of a single isotope exchange reaction should be as short as possible in order to practice economically the process for separation of uranium isotopes by means of isotope exchange reaction. There have heretofore been proposed for acceleration of the isotope exchange reaction increasing the concentration of hydrochloric acid to 8 N or more; to add ferric ions; and also to irradiate the mixed solution with light. Either method, however, proved unsuccessful for various reasons, when the product enriched in $^{235}U$ is to be practically recovered by separation of both compounds. For example, when a ferric compound is added, in an amount sufficient to accelerate the reaction, to a mixed solution containing uranium(IV) and uranium(IV) compounds, uranium-(IV) reacts with the ferric compound to be oxidized into uranium(VI) compound. Thus, uranium (IV) disappears from the mixed system, whereby enrichment and separation of uranium isotopes can no longer be possible. Also it is not favorable to separate uranium(VI) and uranium (IV) compounds after the reaction under acidic conditions by 8 N or more of hydrochloric acid. For example, when a cation exchange resin is used to separate uranium(VI) compound from uranium(IV) compound by selective adsorption of uranium(IV) compound on said resin, there occurs substantially no adsorption of both compounds on the resin.

The object of the present invention is to provide a process for separating uranium isotopes by isotope exchange reaction while accelerating said reaction without interference with the following separation procedure, which separates uranium(IV) compound and uranium(VI) compound by chemical or mechanical means, to enrich $^{235}U$ in uranium(VI) compound and $^{238}U$ in uranium(IV) compound.

The above object is found to be accomplished by a process for separating uranium isotopes in multiple stages, each stage comprising the step of isotope exchange reaction wherein uranium(VI) and uranium(IV) compounds are contacted in a system containing a mixed solution of said compounds and the step of separating uranium(VI) compound enriched with uranium-235 from uranium(IV) compound after said isotope exchange reaction, uranium(VI) and uranium(IV) compounds to be contacted in each stage after the first stage being formed by reducing a portion of respective uranium(VI) compound enriched with uranium-235 isotope separated in the preceding stage, in which the improvement comprises effecting said isotope exchange reaction in each stage in the presence of at least one catalyst dissolved in said mixed solution under acidic conditions wherein the absolute value of the differential redox potential $\Delta E$ is not more than one volt and the concentration of the catalyst expressed in moles per liter is in the range between 0.5 times $|\Delta E|$ and three.

In the present invention, it is necessary to use a mixed solution containing a catalyst, wherein the absolute value of differential redox potential $\Delta E$ is not more that one volt. The differential redox potential $\Delta E$ as employed in the specification and the claims is defined as the difference between the equilibrium oxidation-reduction potentials, i.e. $(E - E_O)$, wherein $E$ and $E_O$ represent equilibrium oxidation-reduction potentials indicated by an oxidation-reduction couple of a catalyst and uranium(IV)-uranium(VI) couple, respectively, in solutions prepared under the same conditions containing equimolar oxidizing and reducing components.

The catalyst of the present invention as mentioned above is classified broadly into the following two groups.

Group A: ionic species of at least one metal selected from the group consisting of copper, indium, thallium, zirconium, tin, vanadium, niobium, arsenic, bismuth, chromium, molybdenum, manganese, rhenium, ruthenium, palladium, iron, mercury and antimony;

Group B: at least one organic compound selected from the group consisting of quinones, hydroquinones, catechols, alloxanes and alloxantins.

Examples of the organic compounds as mentioned above are quinones such as p-benzoquinone, methyl-p-benzoquinone, ethyl-p-benzoquinone, 2,5-dimethyl-p-benzoquinone, duroquinone, chloro-p-benzoquinone, chloranyl, chloranylic acid, o-benzoquinon, α-naphthoquinone, β-naphthoquinone, β-naphthoquinone-4-sulfonic acid, anthraquinone, anthraquinone-1, 8-disulfonic acid and 1-hydroxyanthraquinone; hydroquinones such as hydroquinone, methyl hydroquinone, hydroxy hydroquinone and tetrahydroxy hydroquinone; catechols such as catechol, catechol-o-carboxylic acid and pyrogallol; alloxans such as alloxan and methyl alloxantin.

The catalysts which belong to Group A can exist in various oxidation states. They can be added as either metallic or atomic group ions to effect acceleration. For example, in case of vanadium, it is possible to use cations of di-, tri-, tetra- and penta-valence, oxide ions of vanadium such as meta-, ortho-, pyro- and poly-vanadic acids and complex ions consisting of vanadium.

When $\Delta E$ is positive, the composition of uranium(IV) and uranium(VI) changes in a reaction mixture by the addition of a catalyst in an oxidized form, because it oxidizes uranium (IV) to uranium(VI). In such a case, it is desired to add a catalyst in a reduced form. For example, vanadium is added as trivalent ion. If, however, it is necessary to use a catalyst in an oxidized form when ΔE is positive, the catalyst is used in sufficiently lower concentration as compared with that of uranium(IV). On the contrary, when ΔE is negative, it is desired to add a catalyst in an oxidized form. For example, tin is added as tetravalent ion, not as divalent ion.

It is preferable to use a catalyst having a positive ΔE in a reduced form, because such a catalyst is more effective in catalytic activity than that having a negative ΔE. The catalysts having positive ΔE values include ionic species of copper, vanadium, arsenic, molydenum, manganese, ruthenium, thallium, chromium, palladium, iron, mercury and antimony. Among these ionic species, those of copper, vanadium, arsenic, molybdenum, manganese, ruthenium, iron and antimony are further preferred since they have positive ΔE values of not more than 0.5 volt.

The catalysts which belong to Group A are practically added in the form of salts. Usually, it is convenient to use chlorides because they are cheap and easily available. Other halides, inorganic acid salts such as sulfate and nitrate, and organic acid salts such as oxalate and acetate can also be used. However, it is desirable to use salts having the same anion as predominant anion in the reaction mixture, because the salts are dissociated in the mixture used for the separation of uranium isotopes.

Generally, the more the concentration of a catalyst is, the larger is the acceleration effect. In the present invention, a catalyst with small absolute value of ΔE is found to effect much acceleration even in a low concentration. Namely, the lower limit is correlated with the absolute value of ΔE and enough acceleration is effected by use of a catalyst in a concentration (mol/liter) not less than 0.5 times the absolute value of ΔE. On the other hand, it is impractical to use an accelerator in the concentration exceeding 3.0 M because of the restriction of the solubility, partition ratio etc.

It is possible to effect acceleration by the concurrent use of two or more catalysts in the present invention. For example, two metal ions, two organic compounds or a metal ion and an organic compound can optionally be selected. In some cases, a synergistic effect is attained by the above combinations. Furthermore, a catalyst having restricted acceleration effect due to its low solubility can be combined with another catalyst component to have improved acceleration effect.

As mentioned above, a distinct acceleration effect is observed in a concentration of catalysts larger than 0.5 |ΔE| (M = mol/liter), and at least twice as fast exchange rate as that in the absence of catalyst is observed in the concentration larger than |ΔE| mol/liter of a catalyst. Particularly, among the above mentioned catalysts, those whose ΔE are in the range from 0 to 0.5 V, exhibit at least 5 times as large exchange rate as that in the absence of catalyst. Examples of ionic species whose ΔE are in the range from 0 to 0.5 V include those of copper, zirconium, vanadium, arsenic, molybdenum, manganese, ruthenium, iron and antimony. Though the redox potential is generally known to vary with the acidity, the concentration of ions added, temperature, complexing agents etc., it is only necessary to satisfy the condition that ΔE is in the range from 0 to 0.5 V under the same solution conditions. For example, vanadium, copper, iron, ruthenium, arsenic, etc. are effective. As mentioned above, the synergistic effect can be brought about by a suitable combination of catalysts. Typical examples showing synergistic effects are such combinations vanadium with chromium and vanadium with copper. In addition to these, other examples are the concurrent use of iron with other metals from group A, e.g. iron and copper, iron and chromium and iron and molybdenum. A synergistic effect is also obtained by the suitable combination of at least one kind of catalyst consisting of group A and at least one organic compound consisting of group B. Preferable combinations are iron (e.g. ferrous chloride) and alloxan, iron (e.g. ferrous chloride) and p-benzoquinone, etc.

In the present invention, there are some cases when more acceleration can be effected by addition of complex forming reagents (i.e. ligands) to the mixture containing the catalysts as described above. It is assumed that this effect is obtained by the complex formation between uranium ions and ligands and/or between catalyst ions and ligands which changes E or/and $E_O$ to make |Δ| small. Organic compounds containing nitrogen or/and sulfur with a lone pair have large effects as ligands. Typical examples are amines. For example, such an effect is observed when ferrous ion is used in combination with pyridine base (e.g. pyridine and γ-picoline) and also with cyclic amines ( e.g. piperazine). Other organic compounds such as dicarbonyl compounds, nitro compounds and furans are also effective.

In the present invention, the acceleration effect is determined by the method described below.

According to the McKay's report [H .A .C. McKay, Nature, 142, 997 (1938)], the rate constant, $k$, of the isotope exchange reaction in the chemical equilibrium labelled with isotopes and represented by the following equation is calculated according to the McKay's equation

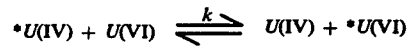

below by determining the exchange ratio F at a time $t$ (minutes) after the start-up of the reaction by mixing uranium(IV) and uranium(VI) with different isotope ratio of uranium-235 and uranium-238 until the isotope exchange reaction is interrupted by a suitable method:

$$k = \frac{- \ln (1 - F)}{[U(IV)] + [U(VI)]} \cdot \frac{1}{t} \text{ (liter/mole.min.)}$$

In the above equation, [U(IV)] and [U(VI)] represent the molar concentrations of uranium(IV) and uranium(VI), respectively, in the mixed solution. The exchange ratio F is given by the following equation:

$$F = \frac{Xt - Xo}{X\infty - Xo}$$

wherein $Xo$, $Xt$ and $X\infty$ represetn the isotope mole fractions in uranium at the start-up of the reaction, after $t$ minutes and at the time of equilibrium, respectively. The measurements are conducted as follows. A solution of depleted uranium with a known molar fraction of isotope in the form of uranium(VI) is prepared in a reaction vessel placed in a water bath. To this solution, a solution of natural uranium in the form of uranium-(IV) kept at the same temperature is added and mixed promptly. After $t$ minutes, the reaction is interrupted by addition of cold hydrochloric acid into the mixture.

Uranium(IV) is then separated and purified by using the ion exchange resin. The sample obtained is analyzed by a mass spectrometer to give the molar fraction of isotope X$t$. The molar fraction is isotope at equilibrium X$\infty$, can be calculated from the quantity of depleted uranium and that of natural uranium used. The reaction rate constant is the absence of catalyst, $K_o$, can be calculated according to the McKay's equation from X$t$ and X$\infty$ obtained as described above. Similarly, the rate constant in the presence of an accelerator, $k$, is measured, and the acceleration effect is determined as $k/k_o$. As known by the McKay's equation, the required time $t$ for the exchange ratio to reach an appointed value is inversely proportional to the $k$ value, when the concentration of uranium(IV) and uranium(VI) is constant. Therefore, the required time, $t$, (min.), is much reduced in the presence of a catalyst with a large $k$. For example, when $k$ is doubled, only a half time is required for the same level of exchange ratio. This means that twice as much output per unit time can be obtained in a chemical uranium enrichment process using the isotope exchange reaction, which results in a great industrial advantage.

Examples of the acceleration effects measured for various catalysts by the above method are shown in Table 1.

times in the presence of a catalyst, the isotope mole ratio of uranium-235 ranges from 0.007267 to 0.007292. These values correspond to the concentration ratio ranging from 1.0021 to 1.0056. It has also been confirmed by experiments that the reaction time $k/k_o$ times as long as that in the presence of a catalyst is required to achieve the same level of isotope exchange in absence of said catalyst.

In practicing the process of the invention, there are two principal modes. One embodiment is a process wherein the step of isotope exchange reaction and the step of separation are repeated by batchwise operations (hereinafter referred to as "batch process"). The other embodiment is a process wherein said both steps are repeated continuously (hereinafter referred to as "continuous process").

I Batch process

The isotope exchange reaction in the batch process proceeds in an acidic solution containing 0.001 to 2.0 M uranium(IV) compound, 0.001 to 2.0 M uranium(VI) compound and a catalyst. The acidic solution has a proton concentration in the range from 0.001 to 6 M and may either be aqueous or a mixture of water with an organic solvent compatible with water such as metha- Table 1

| No. | Catalyst | | Additive | | Acid | Temp | k 1/M.min | k/k$_o$ |
|---|---|---|---|---|---|---|---|---|
| 1 | ferrous chloride | 2.5$^M$ | | | HCl | 1$^M$ | 55° C | 9.5 | 179 |
| 2 | ferrous chloride | 0.1 | | | " | 2 | 50 | 0.082 | 58 |
| 3 | cuprous chloride | 0.1 | | | " | 4 | 70 | 1.4 | 175 |
| 4 | vanadium trichloride | 0.05 | | | " | 4 | " | 0.17 | 21 |
| 5 | chromium trichloride | 0.1 | | | " | 4 | " | 0.01 | 1.25 |
| 6 | p-benzoquinone | 0.05 | | | " | 1.7 | 90 | 2.0 | 1.2 |
| 7 | hydroquinone | 0.1 | | | " | 4 | " | 0.53 | 4.8 |
| 8 | alloxan | 0.1 | | | " | 2 | 50 | 0.37 | 65 |
| 9 | vanadium trichloride chromium trichloride | 0.05 0.1 | | | " | 4 | 70 | 0.38 | 48 |
| 10 | alloxan ferrous chloride | 0.02 0.1 | | | " | 2 | 50 | 0.24 | 170 |
| 11 | ferrous chloride chromium trichloride | 0.07 0.2 | | | " | 2 | " | 0.18 | 129 |
| 12 | ferrous chloride | 0.7 | γ-picoline lithium chloride | 0.3M 2.5M | " | 1.5 | 55 | 14.0 | 264 |
| 13 | ferrous chloride | 0.7 | piperazine lithium chloride | 0.3M 2.5M | " | " | " | 14.8 | 279 |
| 14 | ferrous chloride | 1.0 | ethanol | 40% | " | 4 | " | 42.4 | 820 |
| 15 | ferrous chloride | 0.1 | | | HBr | 2 | 50 | 0.087 | 62 |

The acceleration effects indicated by $k/k_o$ described above can be within the range of from 1.1 to 3,000. In addition, the acceleration method in the present invention does not reduce the isotope exchange rate in known methods. Therefore, even when combined with these known methods, the method of the present invention brings about 1.1 to 3,000 times as large exchange rate as the known methods.

The separation effects of uranium isotopes are measured by a mass spectrometer. As the separation factor of the uranium isotopes is small, an accurate value is obtained when the isotope exchange reaction is repeated. For example, when the procedure is repeated 8 nol, ethanol, ethylene glycol, dioxane, formic acid, acetone, etc. Typical examples of acids to be used are hydrochloric acid or hydrobromic acid, in a concentration ranging from 0.001 to 6 M, and sulfuric acid in a concentration ranging from 0.001 M to 1.0 M. As the acid concentration is lower, the rate of isotope exchange reaction is increased. From the standpoint of prevention of hydrolysis of uranium (IV) compound at an elevated temperature as well as of obtaining larger partition coefficient between uranium (IV) and uranium (VI) compounds in separation however, the acid concentration is deserably from 0.1 M to 6.0 M in case of hydrochloric or hydrobromic acid and 0.05 M to 0.5 M in case of sulfuric acid.

The isotope separation of uranium using the isotope exchange reaction by a method of the present invention is generally carried out at a temperature ranging from 20 to 150° C. As the temperature is higher, the isotope exchange rate is increased to make rapid separation of isotopes possible. However, temperature exceeding 150° C is not practical from a standpoint of the stabilities of uranium (IV), catalysts, etc. Therefore, it is more preferred to use a temperature ranging from 50 to 130° C.

In the present invention, the pressure under which the reaction is conducted is not critical. The operation is generally carried out under an atmospheric pressure at a temperature below the boiling point of the medium employed. Alternatively, when the temperature is higher than the boiling point of the medium employed, the operation is carried out under a pressure enough to prevent the medium from boiling.

Uranium compounds suitable for use in the present invention include chlorides, bromides, sulfates, formates, acetates, propionates and their mixed salts of uranium (IV) and uranium (VI). It is desirable to use the uranium (IV) and uranium (VI) compounds having the same anion as the pedominant anion in the reaction mixture. For example, it is desirable to use chlorides of uranium (IV) and uranium (VI) in a hydrochloric acid solution.

In practicing the batch process, it is essentially required to employ a separation method in combination with the isotope exchange reaction, which can effectively separate uranium (VI) compound from uranium (IV) compound after the isotope exchange reaction. As such separation methods, adsorption separation and extraction separation which are to be practiced in various modes are preferably used. In the adsorption method, separation can often advantageously be effected by selective adsorption of either one of uranium (IV) and uranium (VI) compounds by use of a cation exchange resin or an anion exchange resin which is to be selected depending on the solution compositions. On the other hand, in extraction separation, there can often effectively be practiced extraction of uranium (VI) compound with a solution of tributyl phosphate of tri(n-octylamine) dissolved in toluene thereby to transfer uranium (VI) compound to the organic phase to be separated from uranium (IV) compound. Modified extraction separation by use of porous beads such as silica gel coated with tributyl phosphate or tri(n-octylamine) is also another effective method.

The cation exchange resins to be used in the adsorption method may be, for example, commercially available strongly acidic cation exchange resins having sulfonic acids as exchange groups. For rapid separation to be conducted, however, cation exchange resins with small particle size of 30 to 200 microns or porous resins which can rapidly perform ion exchange are desirably used. Likewise, anion exchange resins may be, for example, commercially available strongly basic anion exchange resins having quaternary ammonium ions as exchange groups. Depending on the solution compositions, however, weakly basic anion exchange resins of tertiary amine having pyridine groups as exchange groups can also be used. As anion exchange resins employed, those with small particle size of 30 to 200 microns and porous resins are also preferable for rapid operation.

It is necessary to use sufficient amount of these ion-exchange resins for adsorbing the whole uranium (IV) or uranium (VI) ions, either of which is to be adsorbed selectively.

The solution to be used in extraction separation is suitably one which can extract selectively either one of uranium (IV) or uranium (VI) compounds to the organic phase. In general, a solution of a phosphoric acid ester or a higher amne dissolved in hydrocarbon solvent is used. Typical examples are toluene or kerosene solution of tributyl phosphate and toluene solution of tri(n-octylamine). It is necessary to use sufficient amount of extractant for extracting the whole or uranium (VI) or unranium (IV) compound which is to be extracted from the aqueous phase.

The solution compositions in the isotope exchange reaction should suitably be selected depending on the separation method to be employed. For example, when cation exchange resins are employed for separation, uranium(IV) cannot sufficiently be adsorbed at a higher acid concentration. The adsorption selectivity between uranium(IV) and uranium(VI) compounds may sometimes be small depending on the acid concentrations. From this standpoint, the practically applicable acid concentration is from 0.1 to 4.0 M in case of hydrochloric and hydrobromic acids, and from 0.05 to 0.5 M in case of sulfuric acid. As to the catalyst, when polyvalent cations are added in large amount, the amount of uranium(IV) ions adsorbed on cation exchange resins is lowered, whereby no effective separation can be realized.

When anion exchange resins are employed, neither uranium(IV) nor uranium(VI) ion is adsorbed on said resin at too low an acid concentration. On the contrary, at too high an acid concentration, both ions are too strongly adsorbed on the resin. In either case, no effective separation is possible. The suitable acid concentration is from 2 to 6 M in case of hydrochloric and hydrobromic acids and from 0.05 to 0.5 M in case of sulfuric acid.

In either case as mentioned above, $Cl^-$, $Br^-$ or $SO_4^{--}$ ions may be replaced partly by salts such as NaCl, LiCl and the like.

When anion exchange resins are employed, some of the catalysts described before cannot be used. For example, a catalyst of molybdenum in 4 M hydrochloric acid is strongly adsorbed on anion exchange resins to prohibit adsorption of uranium(VI) ions and therefore such a catalyst is not suitable for the method wherein anion exchange resins are used. Furthermore, when extraction separation is to be conducted by use of a toluene solution of tributyl phosphate or tri(n-octylamine), it is not suitable to use a mixed solution with organic solvent in the isotope exchange reaction. With some exceptions like those described above, most of the catalysts in Group A or B can be used for accelerating the isotope exchange reaction without disturbing separation of U(IV) and U(VI) ions by anion-exchanger or organic extractant.

Reference is now made to the operational procedures of the isotope exchange reaction and the separation between uranium(IV) and uranium(VI) compounds by taking one example of the separation method wherein anion exchange resins are employed. An acidic solution with a certain acid concentration containing uranium(VI) compound maintained at constant temperature is mixed with an acidic solution with the same acidic concentration containing a reducing agent and a catalyst to convert half the uranium(VI) compound to uranium(IV) while performing isotope exchange reaction therebetween. After a certain lapse of time, the reaction mixture is passed through a column having anion exchange resins of chloride ion type packed therein to adsorb uranium(VI) ions thereon, followed by charging of 4 M hydrochloric acid to remove completely only uranium(IV) compound remaining in the column. Then, uranium (VI) compound is eluted by passing 1 M hydrochloric acid through the column. The uranium(VI) compound in the effluent thus obtained is enriched with $^{235}$U at a ratio corresponding to one stage of the isotope exchange equilibrium. When a series of operations, which comprises reducing uranium(VI) to uranium(IV), carrying out isotope exchange reaction in the presence of a catalyst and separating uranium(VI) from uranium(IV) is repeated, for example, 8 times, uranium(VI) compound is isolated, purified and then subjected to measurement of isotope ratio by mass spectrometer to measure the degree of enrichment of $^{235}$U.

When strongly acidic cation exchange resins are used, uranium(IV) and uranium(VI) ions are adsorbed on the resins by passing the reaction mixture after the isotope exchange reaction in the presence of a catalyst for a certain time through a column packed with the cation exchange resins in the H+ form. Subsequently, an acidic eluant solution (2 - 6 M aqueous acidic solution in case when hydrochloric or hydrobromic solution is used, for example) is passed through the column to move the uranium absorption zone until the uranium(IV) forefront reaches the lower end of the resin column. By this procedure the eluant containing uranium(VI) compound is collected as effluent. By repetition of the series of the same operations as described in case of the anion exchange resins, uranium enriched with $^{235}$U can be obtained.

When a solution of tributyl phosphate or tri(n-octylamine) in toluene is used as the extractant, it is added, after the isotope exchange reaction is carried out in a 4 to 6 M hydrochloric acid solution, to extract the uranium(VI) compound from the reactant solution. By reverse extraction with 1 M hydrochloric acid solution, uranium(VI) compound is transferred again into the aqueous phase and then, after adjustment of the hydrochloric acid concentration, a hydrochloric acid solution containing a catalyst and a reducing agent is added to reduce half the amount of uranium(VI) compound into uranium(IV) compound. The isotope exchange reaction is thereafter commenced to repeat the series of the operations.

As the reducing agents to be used for practicing the process of the invention, those having the capacity to reduce the uranium(VI) compound to uranium(IV) compound are suitable. Examples are trivalent titanium ion, divalent chromium ion and divalent vanadium ion.

II. Continuous process

The present invention can also be practiced by repeating continuously the isotope exchange reaction and separation between uranium(IV) compound and uranium(VI) compound.

According to this embodiment, an acidic solution containing uranium(VI) compound and catalyst at predetermined concentrations, respectively, is fed through a column packed with cation exchange resins having reducing agents adsorbed thereon to form a boundary between the uranium adsorption zone and the reducing agent zone adjacent thereto and reduction is carried out at said boundary while moving said boundary. Meanwhile, in the uranium adsorption zone, the isotope exchange reaction proceeds between uranium(IV) compound and uranium(VI) compound, whereby uranium(IV) ions are adsorbed continuously on cation exchange resins selectively, uranium(VI) ions being more predominantly in the external liquid phase than on the resins. Thus, separation between uranium(VI) and uranium(IV) compounds proceeds.

According to a more preferred embodiment, an acidic solution containing an oxidizing agent (preferably together with a catalyst) is further fed, after feeding of the uranium solution as mentioned above, to the uranium adsorption zone thereby to form another boundary between the uranium adsorption zone and the oxidizing agent adsorption zone, whereby uranium(IV) ion is eluted from the resins while being oxidized into uranium (VI) at said boundary. When a continuous process is practiced according to this embodiment, the adsorbed uranium(IV) ions are brought into contact with an oxidizing agent at the boundary between the uranium adsorption zone and the oxidizing agent adsorption zone to be converted into uranium(VI) ions, whereupon there occurs contact between uranium(IV) and uranium(VI) ions with the presence of catalyst to accomplish one stage isotope exchange equilibrium. Furthermore, at the boundary between the uranium adsorption zone and the reducing agent adsorption zone, uranium(VI) ions in the external aqueous phase are brought into contact with the reducing agent to be converted into uranium(IV) ions which are then adsorbed onto the cation exchange resins. In this case, when viewed in microscopic segment, uranium in the external aqueous phase is enriched by one stage in $^{235}$U relative to that adsorbed on the resins. Accordingly, when the uranium adsorption zone is moved while repeating the oxidation and the reduction as described above, isotope exchange reactions and separations between uranium(IV) and uranium(VI) ions are effected repeatedly, enriching $^{235}$U in the vicinity of the reduction boundary in the uranium adsorption zone and $^{238}$U in the vicinity of the oxidation boundary.

When the isotope exchange reactions and separations between uranium(IV) and uranium(VI) ions are effected continuously in this manner, the number of times of repetition per unit hour of the isotope exchange reaction can be increased in a great advance as compared with the batch process as described above. In this respect, the continuous process is by far superior to the batch process in economical separation of uranium isotope. In practicing the continuous process, however, as compared with the above batch process there are various restrictions on the conditions to be employed, especially from the standpoint of effective separation, because separation between uranium(VI) and uranium(IV) compounds is conducted under the same solution compositions as in the isotope exchange reaction. One of such restrictions is, for example, that the solution compositions should be so selected that uraium(IV) ions can selectively be adsorbed on the strongly acidic cation exchange resins as compared with uranium(VI) ions. Selective adsorption of uranium(IV) ions onto the cation exchange resins in preference over uranium(VI) is essentially required for effective isotope separation by maintaining the boundary between the uranium adsorption zone and the reducing agent zone or the oxidizing agent zone stationary.

As mentioned above, the selectivity in adsorption between uranium(VI) and uranium(IV) ions to cation exchange resins is affected not only by the characteristics of the resins but also greatly by the solution compositions. Above all, the acid employed and its concentration exert a remarkable influence on the selectivity. The acid concentration is limited to the range from 0.001 M to 4 M. When hydrochloric acid or hydrobromic acid is used, its concentration is desirably in the range from 0.01 M to 2 M. Sulfuric acid is used desirably in a concentration of from 0.005 M to 0.5 M.

Generally, it is required to select such condition that the amount of uranium(IV) ion adsorbed on cation exchange resin is more than 0.05 mM per 1 ml wet resin and that the selectivity coefficient, K, of uranium(IV) ion over uranium(VI) ions is at least 2, preferably 5 or more. The selectivity coefficient, K, is defined as follows.

$$K = \frac{\frac{[\overline{U(IV)}]}{[U(IV)]}}{\frac{[\overline{U(VI)}]}{[U(VI)]}}$$

wherein, $[\overline{U(IV)}]$ stands for the concentration of uranium(IV) ion in cation exchange resin, $[U(VI)]$ that in the solution, $[\overline{U(VI)}]$ the concentration of uranium(VI) ion in cation exchange resin and $[U(VI)]$ that in the solution, respectively.

When a complex forming agent is added, the selectivity may be changed depending on the complex formed of uranium(IV) and/or uranium(VI) ions and the ligand. Though there is no general principle to control the selectivity, suitable conditions can be selected individually by adjusting the concentration of the complex forming agent and the acid within the ranges as mentioned above.

A mixed solvent system containing water and an organic solvent compatible with water such as methanol, ethanol, ethylene glycol, dioxane, formic acid, acetone, etc., can also be used. By selection of a suitable mixing ratio, such a mixed solvent may increase the amount of uranium adsorbed per unit amount of resins or increase the selectivity of uranium(IV) ions over uranium(VI) ions.

When the continuous process is employed, there is also restriction in the reducing and the oxidizing agents used. It is required not to reduce the amount of uranium(IV) ions adsorbed and the selectivity of uranium-(IV) ions onto the ion-exchange resins by using suitable reducing or oxidizing agent.

Preferable reducing agents are trivalent titanium ion, divalent chromium ion and divalent vanadium ion. Practically, trivalent titanium ion is most preferred. Preferable oxidizing agents are divalent copper ion and trivalent iron ion, the latter being most preferred.

When the continuous separation process is employed, there are also restrictions in selecting a suitable catalyst of the isotope exchange reaction.

According to the present invention, it is important to find a most suitable catalyst for a particular method of separating uranium(IV) and uranium(VI) compounds among a variety of catalysts which accelerate the isotope exchange reaction between uranium(IV) and uranium(VI) compounds. When a continuous process using cation exchange resin is employed, it is important to choose catalyst which does not reduce either the quantity of uranium(IV) ions adsorbed or the selectivity of uranium(IV) ions over uranium(VI) ions on to the cation-exchange resin. Examples of such a catalysts are cuprous compounds, trivalent vanadium compounds, arsenous acid, trivalent bismuth compounds, trivalent chromium compounds, hexavalent molybdenum compounds, divalent manganese compounds, ferrous compounds and mercurous compounds, when hydrochloric acid or hydrobromic acid is employed. Other examples are tri-or tetravalent vanadium compounds, hexavalent molybdenum compounds, divalent manganese compounds, arsenous acid, trivalent chromium compounds and ferrous compounds, when sulfuric acid is employed. Desirable catalysts are cuprous chloride, vanadium trichloride, arsenous acid, bismuth trichloride, chromium trichloride, ammonium molybdate, manganous chloride, ferrous chloride and mercurous chloride in a hydrochloric acid solution. Other desirable catalysts are cuprous bromide, vanadium tribromide, arsenous acid, bismuth tribromide, ammonium molybdate, manganous bromide and ferrous bromide in a hydrobromic acid solution; ammonium sulfato-vanadate, vanadyl sulfate, ammonium molybdate, manganous sulfate, arsenous acid, chromic sulfate and ferrous sulfate in a sulfuric acid solution. The catalyst is desirably contained also in the oxidizing agent solution when continuous process is carried out by use of an oxidizing agent solution. Trivalent bismuth compounds must be used in a hydrochloric acid solution at an acidity of 0.5 N or more, because precipitates of bismuth compounds are formed in a 0.1 – 0.2 N hydrochloric acid solution.

As a summary, in continuous process, it is necessary to choose a suitable concentration of uranium and the acid, and also the species and the concentration of catalyst, so as 1. not to form insoluble precipitate in a reaction mixture or in a cation exchange resin;
2. to adsorb uranium(IV) ion more than 0.05 mM per 1 ml wet resin; and
3. to have K value more than 2, desirably more than 5 in the step of isotope exchange reaction and in the step of separation of uranium(IV) and uranium(VI) compounds. Though there is no general principle to predict the above described conditions, it is easily known by measuring uranium quantity adsorbed after equilibration of the resin and the reaction solution.

The uranium compounds, the operation temperature and pressure may be the same as mentioned in batch process.

As the cation exchange resins, strongly acidic cation exchange resins having sulfonic acid groups, which may be commercially available, can be used. For the purpose of higher ion exchange rate along with the accelerated isotope exchange reaction, those with small particle size in the range from 30 to 200 microns, desirably from 50 to 120 microns and/or highly porous resins are desirably used.

The present invention is explained in further detail by reference to the following examples, which are set forth for not limiting but illustrative purpose, and it will be apparent to those skilled in the art that various modifications can be made without departure from the spirit of the present invention.

EXAMPLE 1

A 25 liter glass vessel equipped with a jacket, a stirrer and an outlet nozzle at the bottom was kept at 70° C by circulating hot water through the jacket. Twenty liters of a solution (A) containing 0.05 M cuprous bromide of a catalyst in addition to 0.2 M uranyl chloride and 1 M hydrobromic acid were prepared, introduced into the vessel and heated to 70° C. Under vigorous stirring, 2 liters of a solution (B) containing 2 M titanium tribromide hydrobromic acid were added to the solution (A) to reduce half amount of the uranyl ion to uranons ion and also to effect isotope exchange reaction. After 2 minutes, the reaction mixture was poured onto 20 kg crushed ice to interrupt the isotope exchange reaction. Then, the combined solution was supplied to a column filled with 4.6 liters of cation exchange resin (Dowex 50 w × 4) in a hydrogen form to adsorb uranous and uranyl ions. And then, 4 M hydrobromic acid was supplied to the column untill the forefront of a green uranous ion adsorption zone reached the outlet of the column.

About 5 liters of the uranyl bromide solution were withdrawn from the outlet of the column, 15 liters of pure water and 143 g of cuprous bromide were again introduced into the above vessel and heated to 70° C. The concentration of uranyl bromide, cuprous bromide and hydrobromic acid in the combined bromide, cuprous bromide and hydrobromic acid in the combined solution correspond to 0.1 M, 0.05 M and 1 M, respectively. Under vigorous stirring, one liter of a solution containing 2 M titanium tribromide and 1 M hydrobromic acid was added to reduce half the residual uranyl ion to uranous ion and also to effect isotope exchange reaction. After 4 minutes, the reaction mixture described above was poured onto 20 kg crushed ice to interrupt the isotope exchange reaction. Then, the combined solution was supplied to a column filled with 2.3 liters of cation exchange resin (Dowex 50w × 4) in a hydrogen form to adsorb uranous and uranyl ions.

Eight series of operation in total for isotope exchange and separation were also repeated similarly under the conditions indicated in Table 2.

Table 2

| step | cuprous bromide added | titaniumtribromide solution | | | stirring time |
|---|---|---|---|---|---|
| | | titanium tribromide | hydrobromic acid | amount | |
| 3 | 143 g | 2 (M) | 1 (M) | 0.5 (l) | 8 (min.) |
| 4 | " | " | " | 0.25 | 16 |
| 5 | " | 1 | " | " | 32 |
| 6 | " | 0.5 | " | " | 64 |
| 7 | " | 0.2 | " | 0.31 | 128 |
| 8 | " | 0.1 | " | " | 256 |

After the step 8, the isotope ratio of uranyl bromide separated was measured by a mass spectrometer to give the isotope mole ratio of uranium-235 of 0.007282, which was 1.0042 times as large as the natural isotope mole ratio. When the above procedure was repeated in the absence of catalyst, the reaction time was 22 times as long as that in the above Example to obtain the same concentration ratio.

EXAMPLE 2

Twenty liters of a solution (A) containing 0.2 M, 0.1 M alloxan and 30% dioxane in addition to 0.2 M uranyl bromide and 1 M hydrobromic acid were prepared, introduced into the same vessel as described in Example 1 and heated to 70° C. Under vigorous stirring, 2 liters of a solution (B) containing 2 M titanium tribromide, 30% dioxane and 1 M hydrobromic acid was added to the solution (A) to reduce half of the uranyl ion to uranous ion and also to effect isotope exchange reaction. After 1.2 minutes, the reaction mixture was cooled by the same operation as described in Example 1. Uranyl bromide was separated from uranous bromide by using the same cation exchange column as used in the first operation in Example 1.

Fifteen liters of pure water, 6 liters of dioxane and 284 g alloxan in addition to the uranyl bromide solution outflown from the outlet of the column were again introduced into the same vessel as described above in Example 1 and heated to 70° C. The concentration of uranyl bromide, hydrobromic acid, dioxane and alloxan in the combined solution corresponded to 0.1 M, 1 M, 30% and 0.1 M, respectively. Under vigorous stirring, one liter of a solution containing 2 M titanium tribromide, 30% dioxane and 1 M hydrobromic acid was added to reduce half of the residual uranyl ion to uranous ion and also to effect the isotope exchange reaction. After 2.4 minutes, uranyl bromide was separated from uranous bromide by the same operations as in the first operation.

Eight series of operation in total for isotope exchange and separation were repeated similarly under the conditions indicated in Table 3.

Table 3

| | | titanium tribomide solution | | | | |
|---|---|---|---|---|---|---|
| Step | alloxan added | titanium tribomide | hydrobromic acid | dioxane | amount | stirring time |
| 3 | 284 g | 1 (M) | 1 (M) | 30 (%) | 1.0 (l) | 4.8 (min.) |
| 4 | " | " | " | " | 0.5 | 9.6 |
| 5 | " | " | " | " | 0.25 | 19.2 |
| 6 | " | 0.5 | " | " | " | 38.4 |
| 7 | " | 0.2 | " | " | 0.31 | 76.8 |
| 8 | " | 0.1 | " | " | " | 154 |

As a result, the isotope ratio of uranium(VI) separated was measured by a mass spectrometer to give the isotope mole ratio of uranium-235 of 0.007280, which was 1.0039 times as large as the natural isotope mole ratio. When the above procedure was repeated in the absence of alloxan and dioxane, the reaction time was 36 tmes as long as that in the above Example to obtain the same concentration ratio.

EXAMPLE 3

20 liters of a solution (A) containing 0.73 M ferrous chloride of a catalyst in addition to 0.2 M uranyl chloride, and 4 M hydrochloric acid were prepared, introduced into the same vessel as described in Example 1 and heated to 70° C. Under vigorous stirring, 2 liters of a solution (B) containing 2 M titanium trichloride and 4 M hydrochloric acid were added to the solution (A) to reduce half of the uranyl ion to uranous ion and also to effect isotope exchange reaction. After 1.0 minute, 10 liters of ice-cooled 4 M hydrochloric acid was added to the above described reaction mixture to interrupt the isotope exchange reaction and then the combined mixture was supplied to a column filled with 1.8 liters of anion exchange resin (Dowex 1 × 4) in a chloride form to adsorb uranyl ion. After the column was rinsed with 5 liters of 4 M hydrochloric acid to remove uranous ion out of the column, 10 liters of 1 M hydrochloric acid were passed through the column to desorb uranyl ion.

The uranyl chloride solution outflow from the outlet of the column was again introduced into the same vessel as described in Example 1 and heated to 70° C. Under vigorous stirring, 4 liters of a solution containing 0.5 M titanium trichloride, 2.56 M ferrous chloride and 9.5 M hydrochloric acid were added to reduce half of the residual uranyl ion to uranous ion and also to effect the isotope exchange reaction. After 1.4 minutes, 10 liters of ice-cooled 4 M hydrochloric acid was added, and then the reaction mixture was supplied to a column filled with 1.0 liter of anion exchange resin (Dowex 1 × 4) in a chloride form to adsorb uranyl ion.

Eight series of operation in total for isotope exchange and separation were repeated similarly under the conditions as set forth in Table 4.

Table 4

| | titanium trichloride solution | | | | |
|---|---|---|---|---|---|
| Step | titanium trichloride | ferrous chloride | hydrochloric acid | liquid amount | stirring time |
| 3 | 0.5 (M) | 2.56 (M) | 9.5 (M) | 2.0 (l) | 1.4 (min.) |
| 4 | 0.25 | " | " | " | 2.8 |
| 5 | 0.1 | 2.04 | 10 | 2.5 | 6.0 |
| 6 | 0.05 | " | " | " | 12 |
| 7 | 0.025 | " | " | " | 24 |
| 8 | 0.01 | 1.64 | 8.8 | 3.1 | 51.8 |

The isotope mole ratio of uranium-235 was 0.007285, which was 1.0046 times as large as the natural isotope mole ratio.

When the same procedure as described above was repeated in the absence of ferrous chloride as catalyst, the reaction time was 750 times as long as that in the above Example to obtain the same concentration ratio.

EXAMPLE 4

A 25 liter glass vessel equipped with a jacket, a stirrer and an outlet nozzle at the bottom was kept at 55° C by circulating hot water through the jacket. Twenty liters of a solution (A) containing 1.0 M ferrous chloride and 40% ethanol in addition to 0.05 M uranyl chloride and 4 M hydrochloric acid were prepared, introduced into the vessel and heated to 55° C. Under vigorous stirring, 1.0 liter of a solution (B) containing 1.0 M titanium trichloride and 4 M hydrochloric acid was added to the solution (A) to reduce half the uranyl ion to uranous ion and also to effect an isotope exchange reaction. After 0.6 minutes, 10 liters of ice-cooled 4 M hydrochloric acid was added to the reaction mixture to interrupt the isotope exchange reaction, and then the combined mixture was supplied to a column filled with 0.5 liter of anion exchange resin (Dowex 1 × 4) in a chloride form adsorb uranyl ion. After the column was rinsed with 1.0 liter of 4 M hydrochloric acid to remove uranous ion out of the column, 5 liters of 1.0 M hydrochloric acid was passed through the column to desorb uranyl ion.

The uranyl chloride solution outflow from the outlet of the column was again introduced into the above vessel together with 8 liters of ethanol and heated to 55° C. Under vigorous stirring, 7.1 liters of a solution containing 2.86 M ferrous chloride in addition to 0.07 titanium trichloride 11.4 M hydrochloric acid was added to reduce half of the residual uranyl ion to uranous ion and also to effect the isotope exchange reaction. After 1.2 minutes, 10 liters of ice-cooled 4 M hydrochloric acid was added, and then the combined mixture was supplied to a column filled with 250 ml of anion exchange resin (Dowex 1 × 4) in a chloride form to adsorb uranyl ion, and the same operation as the first step was repeated.

Eight series of operation in total for isotope exchange and separation were carried out under the conditions as shown in Table 5.

Table 5

| | titanium trichloride solution | | | | | |
|---|---|---|---|---|---|---|
| Step | titanium trichloride | ferrous chloride | hydrochloric acid | liquid amount | ethanol | stirring time |
| 3 | 0.036 (M) | 2.86 (M) | 11.4 (M) | 7 (l) | 8 (l) | 2.4 (min.) |
| 4 | 0.018 | " | " | " | " | 4.8 |
| 5 | 0.016 | 2.15 | 8.6 | 4 | 4 | " |
| 6 | " | " | " | 2 | 2 | " |
| 7 | 0.008 | " | " | " | " | 9.6 |
| 8 | " | " | " | " | " | 19.2 |

The isotope mole ratio of uranium-235 after 8 step operation was 0.007289, which was 1.0051 times as large as natural isotope mole ratio.

When the above procedure was repeated in the absence of ferrous chloride and ethanol, the reaction time was 800 times as long as that in the above Example to obtain the same concentration ratio.

EXAMPLE 5

A 25 liter glass vessel equipped with a jacket, a stirrer and an outlet nozzle at the bottom was kept at 70° C by circulating hot water through the jacket.

Twenty liters of a solution (A) containing 0.2M cuprous chloride in addition to 0.2M titanium trichloride and 6M hydrochloric acid were prepared and kept at 70° C. On the other hand, 10 liters of a solution (B) containing 0.2M uranyl chloride obtained from natural uranium with an isotope mole ratio of uranium-235 of 0.007252 and 6M hydrochloric acid were prepared and introduced into the vessel and heated to 70° C.

Ten liters of the solution (A) were introduced into the vessel and stirred. After 4.3 minutes, 5 liters of a toluene solution containing 60% tributyl phosphate were introduced into the vessel and the whole mixture was stirred vigorously to extract uranyl chloride into the toluene phase. After 5 minutes, the stirring was discontinued and after the two phases separated, an aqueous phase was withdrawn from the outlet nozzle. Two and half liters of a 1 M hydrochloric acid solution and the combined mixture was stirred vigorously to extract uranyl chloride into the aqueous phase. After 5 minutes, the stirring was discontinued and after the two phases separated, an aqueous phase and a toluene phase were collected separately. The aqueous phase was again introduced into the vessel, and then 2.5 l of concentrated hydrochloric acid was added to adjust the concentration of hydrochloric acid to 6 M and 5 liters of the solution (A) were also introduced into the vessel. The second and subsequent operations were repeated similarly as described above under the conditions set forth in Table 6 to give the results shown in the same table.

Table 6

| | titanium trichloride solution | | | | |
|---|---|---|---|---|---|
| Step | titanium trichloride | cuprous chloride | hydrochloric acid | liquid amount | stirring time |
| 2 | 0.2 (M) | 0.2 (M) | 1 (M) | 5 (l) | 4.3 (min.) |
| 3 | 0.1 | " | " | " | 8.6 |
| 4 | 0.05 | " | " | " | 17.2 |
| 5 | 0.02 | " | " | 6.25 | 43 |
| 6 | 0.01 | " | " | " | 86 |
| 7 | 0.005 | " | " | " | 172 |
| 8 | " | " | " | 13.13 | " |

After the step 8, uranyl chloride was separated and purified in the usual manner. The isotope ratio was analyzed by a mass spectrometer to give the isotope mole ratio of uranium-235 of 0.007271, which was 1.0026 times as large as the natural isotope mole ratio.

When the above described procedure was repeated in the absence of cuprous chloride as catalyst, the reaction time was 140 times as long as that in the above Example to obtain the same concentration ratio.

EXAMPLE 6

The same procedure as Example 5 was repeated using a toluene solution containing 20% trioctylamine instead of a toluene solution containing 60% TBP in the Example 5. Then, the isotope mole ratio of uranium-235 was 0.007272, which was 1.0028 times as large as the natural isotope mole ratio.

When the above procedure was repeated in the absence of cuprous chloride, the reaction time was 140 times as long as that in the above Example to obtain the same concentration ratio.

EXAMPLE 7

In a column having an inner diameter of 10 mm and a length of 1000 mm equipped with a jacket and a filter at the bottom, cation exchange resin (Dowex 50w × 8, 200–400 mesh) in a hydrogen form was filled up to the height of 800 mm. The column was kept at 70° C by circulating hot water through the jacket.

On the other hand, three solutions (A), (B) and (C) shown below were prepared:
- A. an aqueous solution containing 0.05 M uranyl chloride, having an isotope mole ratio of uranium-235 of 0.007252, 0.5 M ferrous chloride, 0.1 M alloxan and 0.5 M hydrogen chloride.
- B. an aqueous solution containing 0.1 M titanium trichloride and 0.5 M hydrogen chloride,
- C. an aqueous solution containing 0.1 M ferric chloride, 0.5 M ferrous chloride, 0.1 M alloxan and 0.5 M hydrogen chloride.

By supplying 1.0 liter of the solution (B) to the above column kept at 70° C, whole of cation exchange resin was substituted with purple trivalent titanium ion. Subsequently, 500 ml of the solution (A) was supplied to the column at a rate of 100 ml per hour. At the boundary, yellow uranyl ion was reduced to green uranous ion by trivalent titanium ion, and the resulting uranous ion was adsorbed on the cation exchange resin. The boundary moving speed was 9.6 cm/hour. Uranium adsorption zone reached to 48 cm after supplying 500 m of the solution (A).

Subsequently, the solution (C) was supplied to the column at a rate of 50 ml/hour. At the rear boundary, green uranous ion was oxidized to yellow uranyl ion by ferric ion and the resulting uranyl ion was desorbed from the resin. The moving speed of this boundary was 4 cm/hour. The uranium solution withdrawn from the outlet of the column was collected as fractions. Uranium in the fraction at the front boundary was separated and purified to be measured by a mass spectrometer. The isotope mole ratio of uranium-235 was 0.007433 which was 1.025 times as large as the natural isotope mole ratio.

When the above procedure was repeated in the absence of ferrous chloride and alloxan as catalyst, the boundary moving speed was 3 cm/day and the operation time 35 times as long only to obtain one-third concentration ratio of the result in the presence of said catalyst.

EXAMPLE 8

Two solutions (A) and (B) as in Example 7 were prepared. By supplying 1.0 liter of the solution (B) to the same column kept at 70° C as described in Example 7, whole of cation exchange resin was substituted with purple trivalent titanium ion. Subsequently, the solution (A) was supplied to the column at the rate of 100 ml per hour. At the boundary, yellow uranyl ion was reduced to green uranous ion by trivalent titanium ion, and the resulting uranous ion was adsorbed on the cation exchange resin. The boundary moving speed was 9.6 cm/hr.

The uranium solution withdrawn from the outlet of the column was collected as 5 ml fractions. Uranium in the forefront fraction was separated and purified to be measured by a mass spectrometer. The isotope mole ratio of uranium-235 was 0.007383 which was 1.018 times as large as the natural isotope mole ratio.

EXAMPLE 9

Into a four-necked flask of 4 liter capacity equipped with a reflux condenser, a thermometer and a dropping funnel are charged a solution of 2 g sodium polyacrylate in 4800 g of water and the solution is stirred. To the solution are added 262.5 g of styrene, 7.5 g of ethyl vinyl benzene, 30 g of divinylbenzene, 3 g of azobisisobutyronitrile and 225 g of butyl stearate to form oily droplets therein. After polymerization is effected at 80° C for 8 hours, the polymerized product is thrown into a washing bath equipped with a filter wherein it is washed with a large excess of methanol and water followed by drying at 70° C for 24 hours. 150 Grams of dried resin is introduced into a reactor of 3 liter capacity, wherein it is sulfonated with 2000 g of dichloroethane and 580 g of chlorosulfonic acid at 10° C for 1 hour. The exchange capacity of this resin is 4.9 meq/g (H form).

The thus obtained resin is packed in a column equipped with a filter at bottom and a jacket of 20 mm in diameter and 2 m in length to the height of 1.6 m and washed sufficiently with hydrochloric acid and water.

A concentrated uranyl solution is prepared by adding a slight excess of hydrogen peroxide to a concentrated uranous solution, which has been obtained by dissolving trichloride solution prepared by dissolving spongy in concentrated hydrochloric metallic uranium in concentrated hydrochloric acid, and boiling the mixture for 30 minutes. This solution is mixed with water, and catalyst to prepare the aqueous uranium solution. A titanium trichloride solution is prepared by dissolving spongy titanium in concentrated hydrochloric acid. The aqueous oxidizing agent solution and the aqueous reducing agent solution are also prepared to have the following compositions:

Uranium solution: $UO_2^{2+}$ 0.05M, Ferrous chloride 0.5M, Proton concentration 1.0M Reducing agent solution: Ti(III) 0.08M, Proton concentration 1.0M Oxidizing agent solution: Fe(III) 0.10M, Ferrous chloride 0.5M, Proton concentration 1.0M The above column is maintained at 90° C and the reducing agent solution is first fed to the column to substitute the whole cation exchange resins with reducing agents. Then, the uranium solution is fed to the column to reduce uranyl ions to uranous ions while contacting the uranyl ions with the reducing agents. The uranous ions formed are adsorbed onto the cation exchange resins, whereby the uranium adsorption zone is gradually enlarged. The supply of the uranium solution is discontinued when the uranium adsorption zone is enlarged to 30 cm.

Subsequently, the oxidizing agent solution is fed to the column to oxidize the uranous ions adsorbed to uranyl ions which flow in the direction of the eluant flow until they reach the reduction boundary at the forward end of the uranium adsorption zone whereupon they are again reduced to uranous ions to be adsorbed on the resins. The uranium adsorption zone continues to move as the oxidizing agent solution is continued to be fed until the boundary at the forefront of the uranium adsorption zone reaches the column bottom. When the uranium solution begins to flow out from the outlet of the column, samples are collected in fractions of each 5 ml. After the boundary at the rear end of the uranium adsorption zone has come out from the column bottom, the supply of the oxidizing agent solution is discontinued. During said operation, the amount of the eluant is controlled at 240 cc/hour and the moving speed of the uranium adsorption zone at 2.3 m/day.

The total concentration of uranium in samples collected in fractions, when measured quantitatively at 390 m μ by developing color by addition to a portion of said samples 3% aqueous hydrogen peroxide solution, 20% aqueous sodium carbonate solution and 20% aqueous caustic soda solution, is found to be 0.058 M. Furthermore, a portion of the samples is subjected to colorimetric analysis to find out that the uranous concentration is 0.009 M. When the isotopic ratio is measured by mass spectrometer for the fractions nearest to the front and rear boundaries, respectively, the isotopic ratio near the front boundary is found to be 0.006804 and that near the rear boundary 0.007749, said values corresponding to 0.9382 times and 1.0685 times, respectively, as much as the value of natural isotope mole ratio 0.007252.

The extent of acceleration of isotope exchange reaction in terms of $k/k_o$ at 90° C, at uranous and uranyl concentrations of each 0.05 M at proton concentration of 1.0 M and at ferrous chloride concentration of 0.5 M is found to be 80.

The selective adsorption power of uranous ion to cation exchange resins at uranous and uranyl concentrations of each 0.025 M at 90° C having the same composition of the uranium solution as set forth above is found to be 6.8 times as strong as that of uranyl ion.

EXAMPLES 10 - 14

Example 9 is repeated, but the solution conditions as shown in Table 7 are used. The results of measurement of flow amounts, the moving speeds and the isotopic ratios are shown in Table 8.

Table 7

| Example | Ti(III) conc.(M) | U(VI) conc.(M) | Fe(III) conc.(M) | Proton conc.(M) | Catalyst kind | Catalyst conc. | $k/k_o$ | Selectivity coefficient K |
| --- | --- | --- | --- | --- | --- | --- | --- | --- |
| 10 | 0.09 | 0.045 | 0.08 | 1.0 | Ethylenediamine Dioxane $VCl_4$ Pyridine | 0.5M 50v/v% 0.05M 0.5M | 63 | 6.8 |
| 11 | 0.08 | 0.05 | 0.10 | 0.6 | $FeCl_2$ | 0.3M | 13 | 8.4 |
| 12 | 0.06 | 0.04 | 0.07 | 0.8 | Picolic acid Dioxane | 0.1M 30v/v% | 57 | 10.5 |
| 13 | 0.08 | 0.05 | 0.08 | 0.7 | β - naphthoquinone Nitro methane Chloranylic acid Alloxan | 0.05M 0.1M 0.02M 0.01M | 10 | 6.8 |
| 14 | 0.10 | 0.06 | 0.12 | 1.0 | Acetyl acetone Formic acid | 0.5M 10v/v% | 53 | 5.9 |

Table 8

| Example | Flow amount (1/hour) | Boundary moving speed (m/day) | Isotope mole ratio Front | Isotope mole ratio Rear |
| --- | --- | --- | --- | --- |
| 10 | 562 | 4.5 | 0.006860 | 0.007622 |
| 11 | 254 | 2.2 | 0.006674 | 0.007799 |
| 12 | 690 | 4.5 | 0.006730 | 0.007752 |
| 13 | 1120 | 10.5 | 0.006983 | 0.007554 |
| 14 | 319 | 4.4 | 0.006860 | 0.007636 |

What we claim is:

1. In a process for separating uranium isotopes in multiple stages, each stage comprising the step of isotope exchange reaction wherein uranium(VI) and uranium(IV) compounds are contacted in a system containing a mixed solution of said compounds and the step of separating uranium(VI) compound enriched with uranium-235 from uranium(IV) compound after said isotope exchange reaction, uranium(VI) and uranium(IV) compounds to be contacted in each stage after the first stage being formed by reducing a portion of respective uranium(VI) compound enriched with uranium-235 isotope separated in the preceding stage, the improvement which comprises effecting said isotope exchange reaction in each stage in the presence of at least one catalyst dissolved in said mixed solution under acidic conditions wherein the absolute value of the differential redox potential ΔE is not more than one volt and the concentration of the catalyst expressed in moles per liter is in the range between 0.5 times |ΔE| and three.

2. A process as claimed in claim 1, wherein the absolute value of ΔE is not more than 0.5 volt.

3. A process as claimed in claim 1, wherein the ΔE is positive.

4. A process as claimed in claim 2, wherein the ΔE is positive.

5. A process as claimed in claim 1, wherein the catalyst is ionic species of at least one metal selected from the group consisting of copper, indium, thallium, zirconium, tin, vanadium, niobium, arsenic, bismuth, chromium, molybdenum, manganese, rhenium, ruthenium, palladium, iron, mercury and antimony.

6. A process as claimed in claim 5, wherein the catalyst is ionic species of at least one metal selected from the group consisting of copper, vanadium, arsenic, molybdenum, manganese, ruthenium, iron and antimony.

7. A process as claimed in claim 1, wherein the catalyst compound is at least one organic compound selected from the group consisting of quinones, hydroquinones, cathechols, alloxans and alloxantins.

8. A process as claimed in claim 7, wherein the organic compound is at least one selected from the group consisting of p-benzoquinone, $\beta$-naphthoquinone, hydroquinone, catechol, alloxan and alloxantin.

9. A process as claimed in claim 1, wherein the catalyst contains iron as essential component.

10. A process as claimed in claim 9, wherein the catalyst is a combination selected from the group consisting of iron-copper, iron-chromium, iron-molybdenum, iron-alloxan, iron-hydroquinone and iron-p-benzonquinone.

11. A process as claimed in claim 5, wherein the catalyst is a combination selected from the group consisting of vanadium-chromium and vanadium-chronium and vanadium-copper.

12. A process as claimed in claim 1, wherein the isotope exchange reaction is conducted in the presence of a ligand.

13. A process as claimed in claim 12, wherein the ligand is at least one organic compound containing at least one of nitrogen and sulfur having a lone pair.

14. A process as claimed in claim 12, wherein the ligand is selected from the group consisting of dicarbonyl compounds, nitro compounds and furans.

15. A process as claimed in claim 13, wherein the ligands are amines.

16. A process as claimed in claim 15, wherein the catalyst and the ligand are iron-pyridine base or iron-piperazine.

17. A process as claimed in claim 1, wherein an ion-exchange resin is employed for separating U(IV) and U(VI) compounds 18. A process as claimed in claim 1, wherein the isotope exchange reaction and separation of uranium (VI) compound from uranium (IV) compound are conducted continuously in multiple stages by first feeding a reducing agent solution and by feeding an acidic solution containing uranium (VI) compound and catalyst subsequently through a cation exchanger thereby to form a boundary between the adsorption zone of the reducing agent and the uranium adsorption zone and to move said boundary while reducing uranium (VI) compound to uranium (IV) compound at said boundary.

19. A process as claimed in claim 18, wherein the quantity of uranous compound adsorbed by the exchange resin is more than 0.05 mM per/ml wet resin and the selectivity coefficient of uranium (IV) ion compared with uranium (VI) ion is more than 2.

20. A process as claimed in claim 18, wherein an oxidizing agent solution is further fed after feeding of the uranium (VI) solution thereby to form another boundary between the adsorption zone of the oxidizing agent and the uranium adsorption zone and to move said boundary while oxidizing uranium (IV) compound formed by reduction of U(VI) compound.

21. A process as claimed in claim 20, wherein the oxidizing agent solution contains catalyst.

22. A process as claimed in claim 20, wherein the oxidizing agent is trivalent iron ion.

23. A process as claimed in claim 18, wherein the reducing agent is trivalent titanium ion.

24. A process as claimed in claim 20, wherein the reducing agent is trivalent titanium ion.

25. A process as claimed in claim 20, wherein the oxidizing agent is trivalent iron ion and the reducing agent is trivalent titanium ion.

* * * * *

UNITED STATES PATENT AND TRADEMARK OFFICE
CERTIFICATE OF CORRECTION

PATENT NO. : 4,049,769
DATED : September 20, 1977
INVENTOR(S) : Maomi Seko et al Page 1 of 2

It is certified that error appears in the above–identified patent and that said Letters Patent are hereby corrected as shown below:

| COLUMN | LINE | |
|---|---|---|
| 1 | 40 | "There" should start a new paragraph. |
| 1 | 50 | cancel "IV" (second occurrence) and substitute -- VI --. |
| 2 | 51 | correct spelling of "benzoquinone". |
| 2 | 58 | after "methyl" insert -- alloxan; and alloxantins such as alloxantin and methyl --. |
| 4 | 21 | after "△" insert -- E --. |
| 7 | 64 | after "amine" insert -- type --. |
| 13 | 7 | before "hydrobromic" insert -- and 1 M --. |
| 15 | 47 | before "adsorb" insert -- to --. |
| 15 | 57 | before "11.4" insert -- ; and --. |

UNITED STATES PATENT AND TRADEMARK OFFICE
CERTIFICATE OF CORRECTION

PATENT NO. : 4,049,769
DATED : September 20, 1977
INVENTOR(S) : Naomi Seko et al PAGE 2 of 2

It is certified that error appears in the above-identified patent and that said Letters Patent are hereby corrected as shown below:

| COLUMN | LINE | |
|---|---|---|
| 18 | 42 | delete "spongy in concentrated hydrochloric". |
| 21 | 21 | delete "and vanadium-chromium". |
| 22 | 16 | before "exchange" insert -- cation --. |

Signed and Sealed this

Twenty-third Day of May 1978

[SEAL]

Attest:

RUTH C. MASON
Attesting Officer

LUTRELLE F. PARKER
Acting Commissioner of Patents and Trademarks